United States Patent
Rodriguez

(10) Patent No.: US 6,804,800 B2
(45) Date of Patent: Oct. 12, 2004

(54) METHOD AND APPARATUS FOR DETECTING AND RECOVERING FROM ERRORS IN A SOURCE SYNCHRONOUS BUS

(75) Inventor: Pablo M. Rodriguez, Foster City, CA (US)

(73) Assignee: Intel Corporation, Santa Clara, CA (US)

( * ) Notice: Subject to any disclaimer, the term of this patent is extended or adjusted under 35 U.S.C. 154(b) by 652 days.

(21) Appl. No.: 09/751,050

(22) Filed: Dec. 29, 2000

(65) Prior Publication Data

US 2002/0087921 A1 Jul. 4, 2002

(51) Int. Cl.[7] .................................................. G06F 11/00
(52) U.S. Cl. .......................................... 714/56; 714/43
(58) Field of Search .............................. 714/56, 43, 44; 710/100, 300, 306, 112, 305; 327/22, 23

(56) References Cited

U.S. PATENT DOCUMENTS

| | | | | |
|---|---|---|---|---|
| 5,001,712 A | * | 3/1991 | Splett et al. ................. | 714/703 |
| 5,758,188 A | * | 5/1998 | Appelbaum et al. .......... | 710/35 |
| 6,016,066 A | * | 1/2000 | Ilkbahar ...................... | 327/23 |
| 6,247,088 B1 | * | 6/2001 | Seo et al. ................... | 710/305 |
| 6,433,600 B2 | * | 8/2002 | Ilkbahar ..................... | 327/198 |
| 6,505,262 B1 | * | 1/2003 | Kurd et al. ................. | 710/100 |

* cited by examiner

Primary Examiner—Dieu-Minh Le
(74) Attorney, Agent, or Firm—Jeffrey S. Draeger

(57) ABSTRACT

A method and apparatus for detecting and in some cases recovering from errors in a source synchronous bus. One embodiment of a disclosed apparatus includes a plurality of strobe inputs to receive a plurality of strobe signals. A plurality of data inputs receive a plurality of data signals transmitted in a source synchronous manner in conjunction with the strobe signals. Bus control logic produces an externally visible indication that an error has occurred if a glitch on one or more of the plurality of strobe signals is detected.

6 Claims, 6 Drawing Sheets

METHOD AND APPARATUS FOR DETECTING AND RECOVERING FROM ERRORS IN A SOURCE SYNCHRONOUS BUS

BACKGROUND

1. Field of the Invention

The present disclosure pertains to the field of signal transfer between components. More particularly, the present disclosure pertains to detection and in some cases the recovery from errors occurring in a source synchronous signal transmission system.

2. Description of Related Art

Reliability of a computer system is becoming an increasingly important characteristic. Although many parts of the computer system pose challenges with respect to reliability, high-speed connections between components are particularly prone to problems. Advances which improve the ability to detect and/or correct signaling errors of high-speed connections between components may therefore be highly beneficial in improving the overall reliability of a system.

Parity bits and error correction codes (ECC) are examples of well known techniques for detecting and/or correcting signal transmission errors. Both parity bits and error correction codes are typically computed for a set of bits by the bus. For example, a parity bit or error correction code may cover a the data bus or a subset thereof (e.g., a byte, word, double-word, etc.). If an error is detected by a receiver, some prior art techniques permit reconstruction of the original data so long as only a few bits of data are corrupted. However, if large portions of a bus are affected, parity and ECC techniques are typically unable to reconstruct the original data.

A source synchronous bus is a well known bus for high-speed transmission of signals. Source synchronous buses convey data in conjunction with strobe (may also be referred to as clock) signals, causing the strobe signals to experience the same or similar propagation delays as the transmitted data. The receiver uses the strobe signals or derivatives thereof to capture the conveyed data. Thus, source synchronous communication eliminates many problems of traditional, common clocked data transfers, such as flight time delays, and clock skew. Since the timing between strobe signals and the data are more tightly controlled than in common-clock buses, some source synchronous systems are able to achieve higher data transmission bandwidths.

However, strobe-based source-synchronous data transfers are particularly susceptible to noise. Since the strobe signals are used to capture the transmitted data, the integrity of the strobe signals becomes important to ensuring reliable data transmission. Strobe glitches may occur for a great number of reasons. For example, cross coupling of noise from other signal lines, clock jitter, power supply noise, silicon aging, and alpha particles, just to name a few. As signaling speeds increase and signaling voltages decrease, these glitch causing phenomena are likely to have an even greater impact, raising the frequency of glitches, and consequently increasing the probability of data corruption. If a strobe glitch occurs, the typical source synchronous system is not likely to have merely one or two data bits corrupted, but rather is likely to experience complete corruption of all data captured by that strobe signal because all data captured by that strobe is captured at the wrong time. Thus, prior art parity or ECC techniques aimed at correcting only a few bits are unlikely to be effective in combating errors induced by strobe glitches.

Some prior art techniques to combat glitch-induced errors attempt to filter out such glitches from the strobe signals (or internally buffered versions). Some prior art techniques merely detect or filter out such errors in certain manners and fail to specify how to react efficiently. One prior art techniques involves filtering out transitions on a particular strobe signal that occur within a particular time window after a transition on that strobe signal. Such an approach may be limited as it relies on the corrupted strobe itself to help remove the corruption. If multiple glitches occur on a strobe or if glitch timing circumvents the filter, such self-filtering may not be effective. Additionally, prior art techniques may assume that filtering is successful, possibly still allowing corrupt data to be processed if that assumption is incorrect.

Thus, it would be advantageous to develop improved techniques to cope with signal corruption on a source synchronous bus.

BRIEF DESCRIPTION OF THE FIGURES

The present invention is illustrated by way of example and not limitation in the figures of the accompanying drawings.

DETAILED DESCRIPTION

The following description provides a method and apparatus for detecting and recovering from errors in a source synchronous bus. In the following description, numerous specific details such as signal names, logic levels, edge transitions, and logic partitioning/integration choices are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement appropriate logic circuits without undue experimentation.

Disclosed techniques may allow more robust computer systems to be produced by improving the integrity of signal transfer over source synchronous buses in the computer systems. In some embodiments, glitches on source synchronous buses may be detected and recovered from, so that transmission-induced data corruption does not adversely affect system operation. In some embodiments, source synchronous strobe glitches may be signaled externally by a bus agent detecting a glitch, allowing system recovery techniques to compensate for the signal transmission problem. In some cases, bus transactions may be retried to obtain the data which experienced transmission difficulties without involving other system resources.

Since the present disclosure details a signaling protocol that may be appropriate under a variety of circumstances and for a variety of different types of signals, terms such as clock, strobe, data, and signal, are meant in their broadest sense. For example, a data signal is only referred to as a data signal to distinguish it from a strobe or clock signal. The data signal may convey any type of data, such as address data, control data or memory data (i.e., traditional data on data pins of a processor, cache, or memory). Additionally, the terms clock and strobe are used to indicate any signal that provides edges or transitions to assist in determining when to latch data signals.

The techniques described herein may be used in a variety of electronic systems. Computer systems such as personal computers, server computers, special-purpose computers, or any other type of computer system may employ the signaling techniques described. Additionally, other electronic devices that have multiple components that communicate over buses may use the described techniques. For example, signal processing systems or devices, communication systems or devices, networking systems or devices and/or personal digital assistants, phones or the like may use the disclosed techniques.

Figure 1:
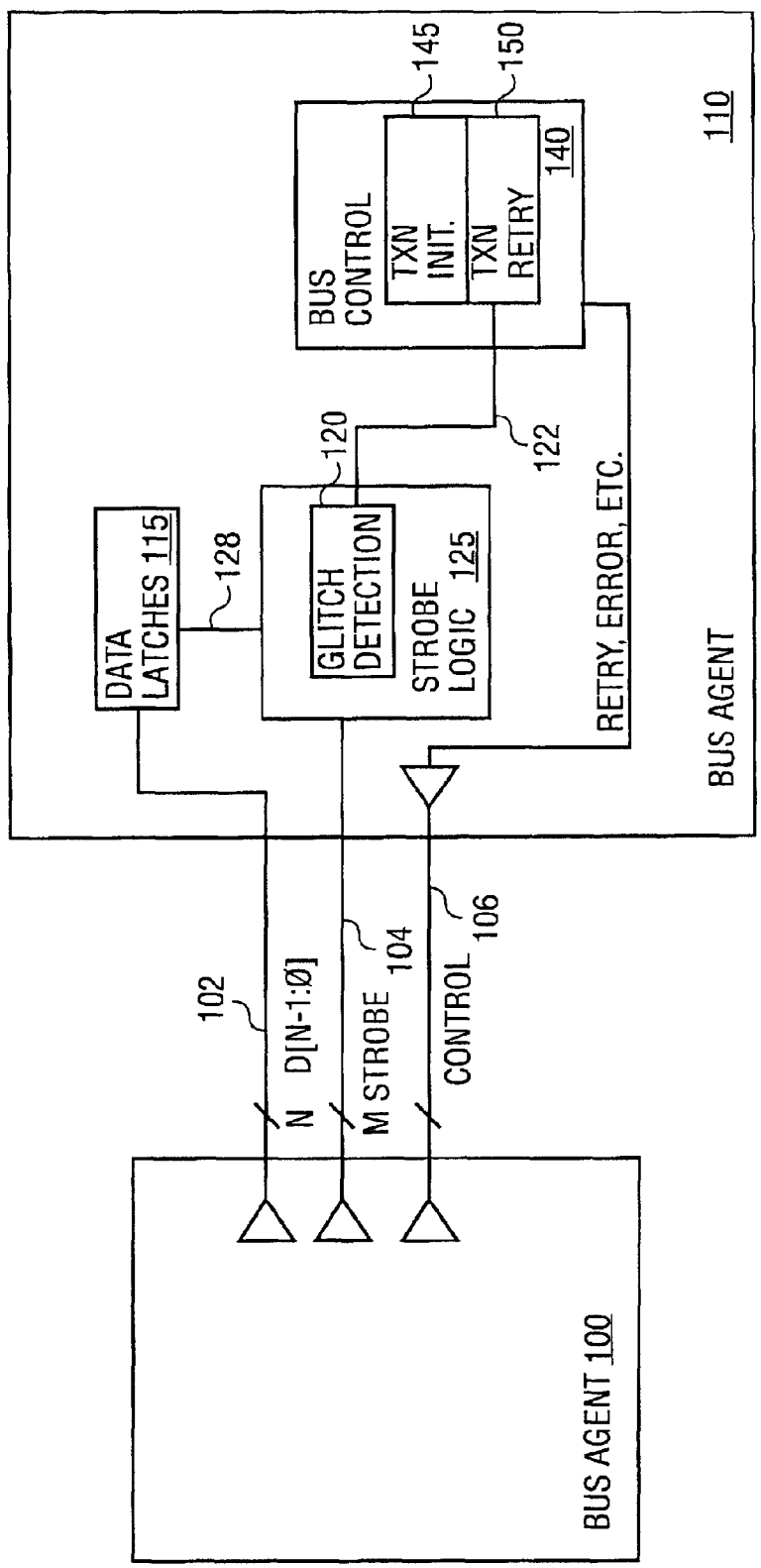
FIG. 1 illustrates one embodiment of a system utilizing presently disclosed techniques.

FIG. 1 illustrates one embodiment of a system that allows detection and recovery from strobe glitches. The system of FIG. 1 includes two bus agents, bus agent 100 and bus agent 110. Bus agent 100 and bus agent 110 communicate at least in part using a source synchronous bus. In particular, a set of M strobe signals are transmitted on a bus 104 in conjunction with a set of N data signals on a bus 102. The source synchronous signaling operates in the traditional source synchronous manner, with the data signals being latched by latches triggered by the strobe signals or by signals derived from the strobe signals. In addition, the bus agent 100 and the bus agent 110 communicate control information using a bidirectional control bus 106. The signals on the control bus 106 may or may not be transmitted and a source synchronous fashion.

The signaling techniques disclosed may be used with a wide variety of different types of bus agents. For example, the bus agents 100 and 110 may both be processors. Alternatively, the bus agents may be any combination of processors and/or other bus agents including bus bridges, memory controllers, or memory devices (cache, main, or other memory devices), graphics processors, digital signal processors, communications processors, etc. These or other known or otherwise available bus agents may be used. Internal details of the bus agent 100 are not shown; however, the bus agent 100 may be similar to the bus agent 110. Additional bus agents may also be coupled together with bus agents 100 and 110 and may employ the presently disclosed techniques as well. Bus agents 100 and 110 of course contain other logic blocks and circuitry than those shown as needed to perform the particular operations for which the bus agents were intended; however, such other logic blocks that are not shown or discussed are not necessary to obtain an understanding of the disclosed techniques.

The bus agent 110 includes bus control logic 140 that generally understands and maintains the protocols by which the bus agent 110 communicates with other agents on the bus. Thus, the bus control logic 140 initiates, responds to, and completes various transactions with other bus agents. Any known or otherwise available bus arbitration and/or transfer sequencing protocols may be used. As illustrated in FIG. 1, the bus control logic 140 includes transaction initiation logic 145 and transaction retry logic 150. The transaction initiation logic 145 starts transactions on the bus according to the needs of the bus agent 110.

The transaction retry logic 150 receives at least one input that indicates a problem with a transaction. The transaction retry logic 150 causes the bus control logic 140 to externally indicate that an error has occurred. In one embodiment, an error may be signaled on the control bus 106. In another embodiment, the bus agent 110 may discard data received in conjunction with the transaction in which an error was detected, and may then just retry the transaction without involving other system resources (e.g., software or firmware error handling routines). Such an approach advantageously allows continued processing, whereas some prior art systems reset in response to such bus errors since corrupted data may have propagated into computations.

In the embodiment of FIG. 1, the transaction retry logic 150 may be triggered by a glitch indicator signal on a signal line 122. The glitch indicator signal may be generated by glitch detection logic 120, which is a part of strobe logic 125 that receives the set of strobe signals from the bus. The strobe logic 125 not only detects glitches using the glitch detection logic 120 but also generates internal clock signals which are conveyed to a set of data latches 115 via signal lines 128 in order to latch data transmitted with the strobe signals. In fact, in some embodiments, the glitch detection logic 120 uses the generated internal clocks to detect strobe glitches.

Figure 2:
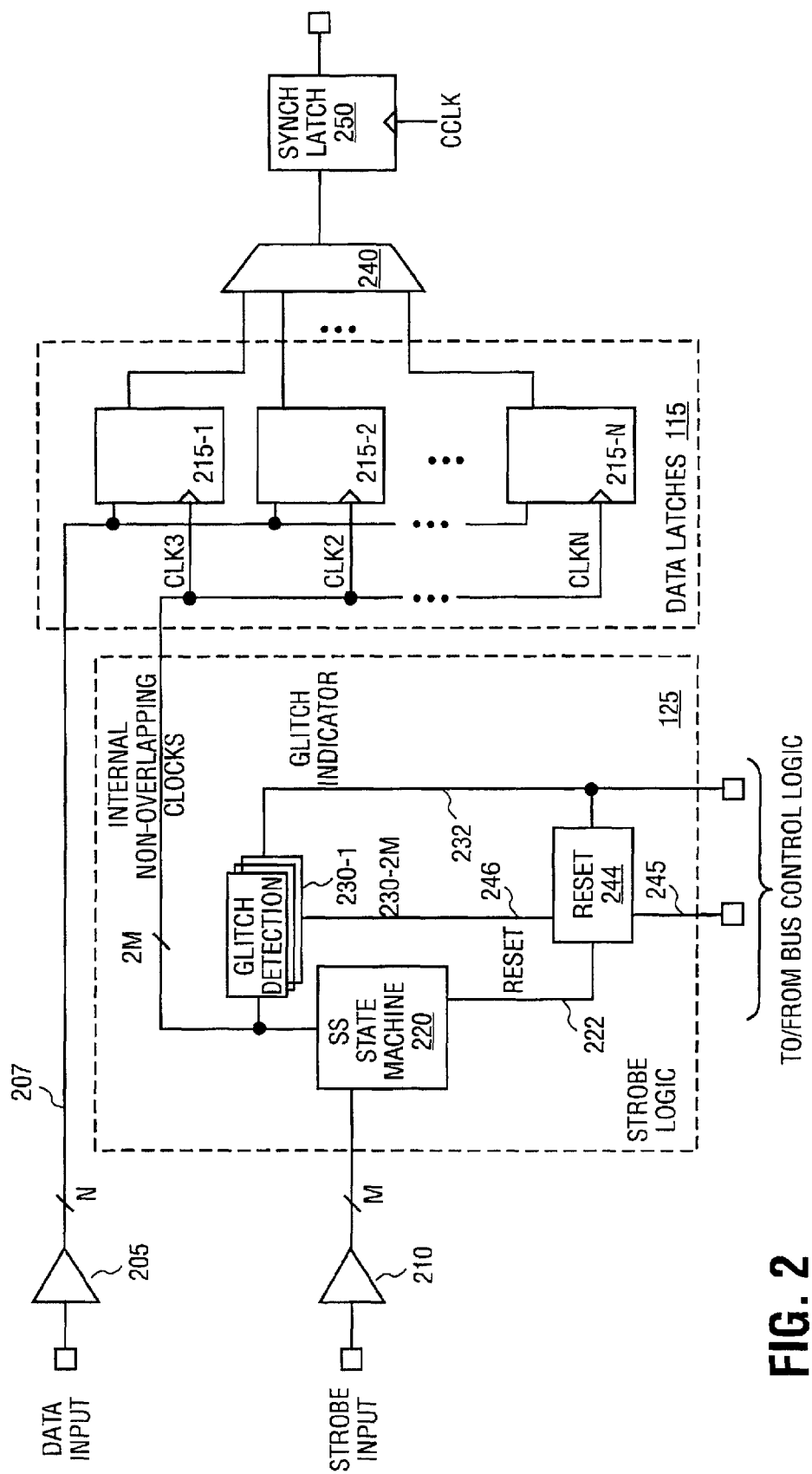
FIG. 2 illustrates one embodiment of strobe and data latch logic for a bus agent.

FIG. 2 illustrates additional details of logic that may be included in the bus agent 110 as well as details of the strobe logic 125 and the set of data latches 115 for one embodiment. In the embodiment shown in FIG. 2 the strobe logic 125 receives strobe input signals through a buffer 210. A source synchronous state machine 220 receives M strobe signals and generates therefrom 2M internal clock signals. In one embodiment, the internal clock signals are signals appropriate to latch sequential data items in separate latches. As will be appreciated by one of skill in the art, a variety of state machines, clock generation circuits, or like logic or circuitry are equivalents that may be used for this purpose.

Figure 3:
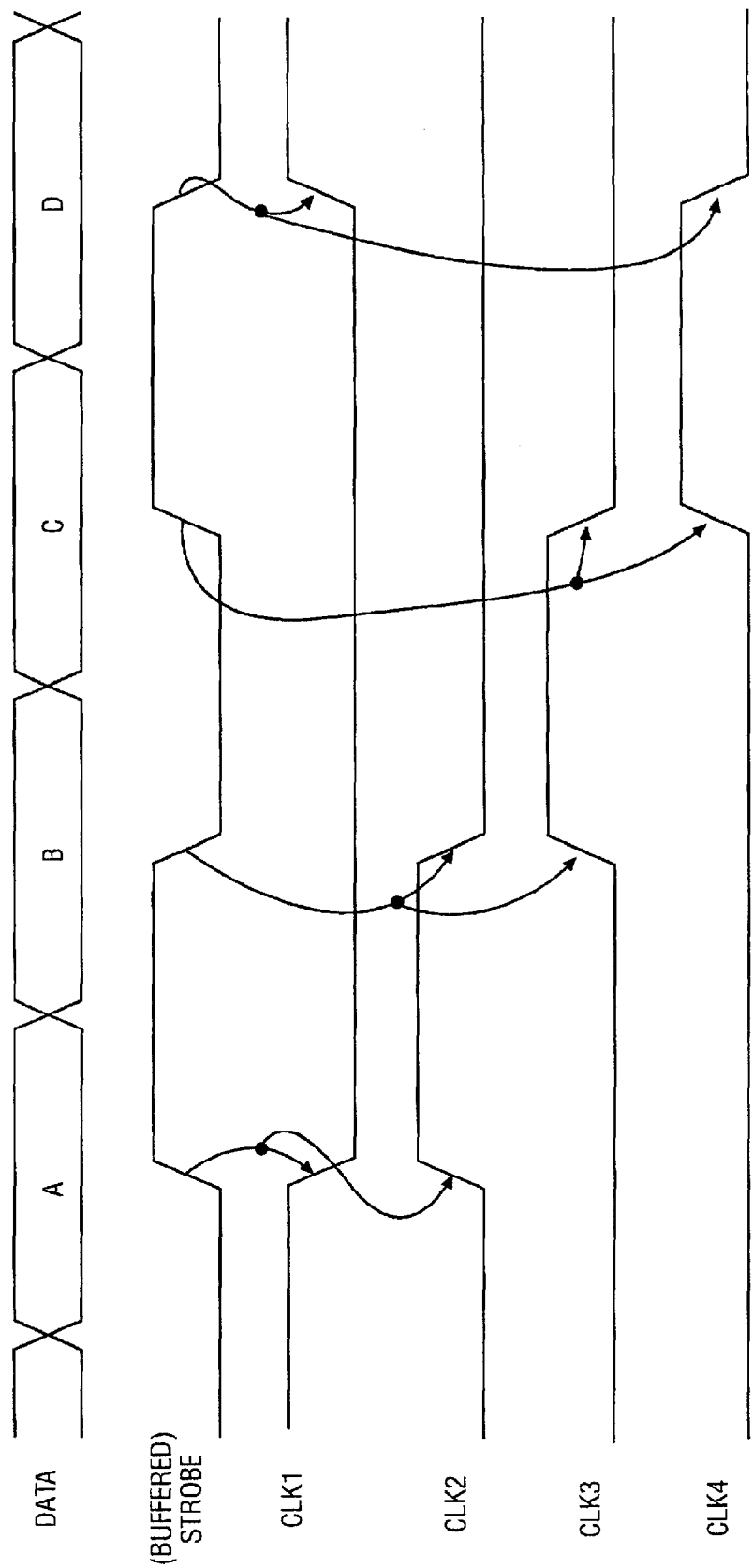
FIG. 3 illustrates strobe, clock, and data waveforms for one embodiment.

The internal clock signals may be non-overlapping clocks with sequential active periods. For example, the clock signals and a strobe signal for one embodiment are shown in FIG. 3. In FIG. 3, M equals two, and therefore there are four internal non-overlapping clock signals, CLK1, CLK2, CLK3, and CLK4. Four data elements are shown as being transmitted in FIG. 3. The first data element, A, is latched by the falling edge of CLK1. Similarly, the second (B), third (C), and fourth (D) data elements are latched by respectively the falling edges of CLK2, CLK3, and CLK4. Thus, the transition ending the active period (e.g., the logical high level in the embodiment shown) of each internal clock latches one data element. In one embodiment, the internal clock signals are derived from complementary strobe signals. In FIG. 3, only one strobe signal is shown; however, it will be appreciated by one of skill in the art that each of two complementary strobe signals has a level transition at substantially the same time. Two separate complementary signals may be used to ensure better signal integrity.

Despite efforts to ensure signal integrity by proper routing, driving, and even the use of complementary strobe signals, glitches may still occur in some systems. Accordingly, the strobe logic 125 shown in FIG. 2 provides glitch detection logic that includes a set of glitch detectors 230-1 through 230-2M. In other words, in one embodiment there are the same number of glitch detectors as there are non-overlapping internal clock signals. The glitch detection logic generates a glitch indicator on a signal line 232 when a glitch is detected on any of the internal clocks. Notably, the glitch detection logic monitors the internal clocks generated by the source synchronous state machine 220 rather than analyzing the incoming strobe signals directly in this embodiment. This approach may facilitate more robust detection of and enhanced abilities to recover from errors because of the larger numbers of and the more unique relationships between the internal clock signals. Moreover, the particular data corrupted by glitch may be more precisely identified in some embodiments.

The strobe logic 125 also includes reset logic 244. The reset logic 244 resets the glitch detection logic via a signal on signal line 246 and the source synchronous state machine 220 via a signal on signal line 222 to allow new transactions to proceed after a glitch has been detected and appropriately handled. In particular, the reset logic 244 receives an indication on a signal line 245 from the bus control logic that a particular transaction has completed. If a glitch associated with that transaction was indicated by the glitch detection logic, the reset logic 244 waits to reset the glitch detection logic and the state machine until the completion of the transaction so that normal bus operation is not disrupted. Instead of disrupting bus operation, the bus agent may reset the internal strobe logic and initiate the same transaction once again. A responding bus agent will again attempt to complete the transaction, and time-consuming routines or otherwise disruptive procedures for error recovery (e.g., resetting the entire system) need not be employed.

The embodiment of FIG. 2 also illustrates details of the data latches 115 for one embodiment. In the illustrated embodiment, each of the 2M internal clocks is routed to one of a set of deskew latches, latches 215-1 through 215-N. A multiplexer 240 is coupled to each of the latches 215-1 through 215-N, and a synchronizing latch 250 receives data from the multiplexer 240. The synchronizing latch 250 is clocked by a core clock signal CCLK, which may be of a different frequency than other signals used in receiving and capturing the data. Both deskew techniques and synchronizer techniques are well known to those of skill in the art, so known or otherwise available devices may be used for these purposes.

Figure 4:
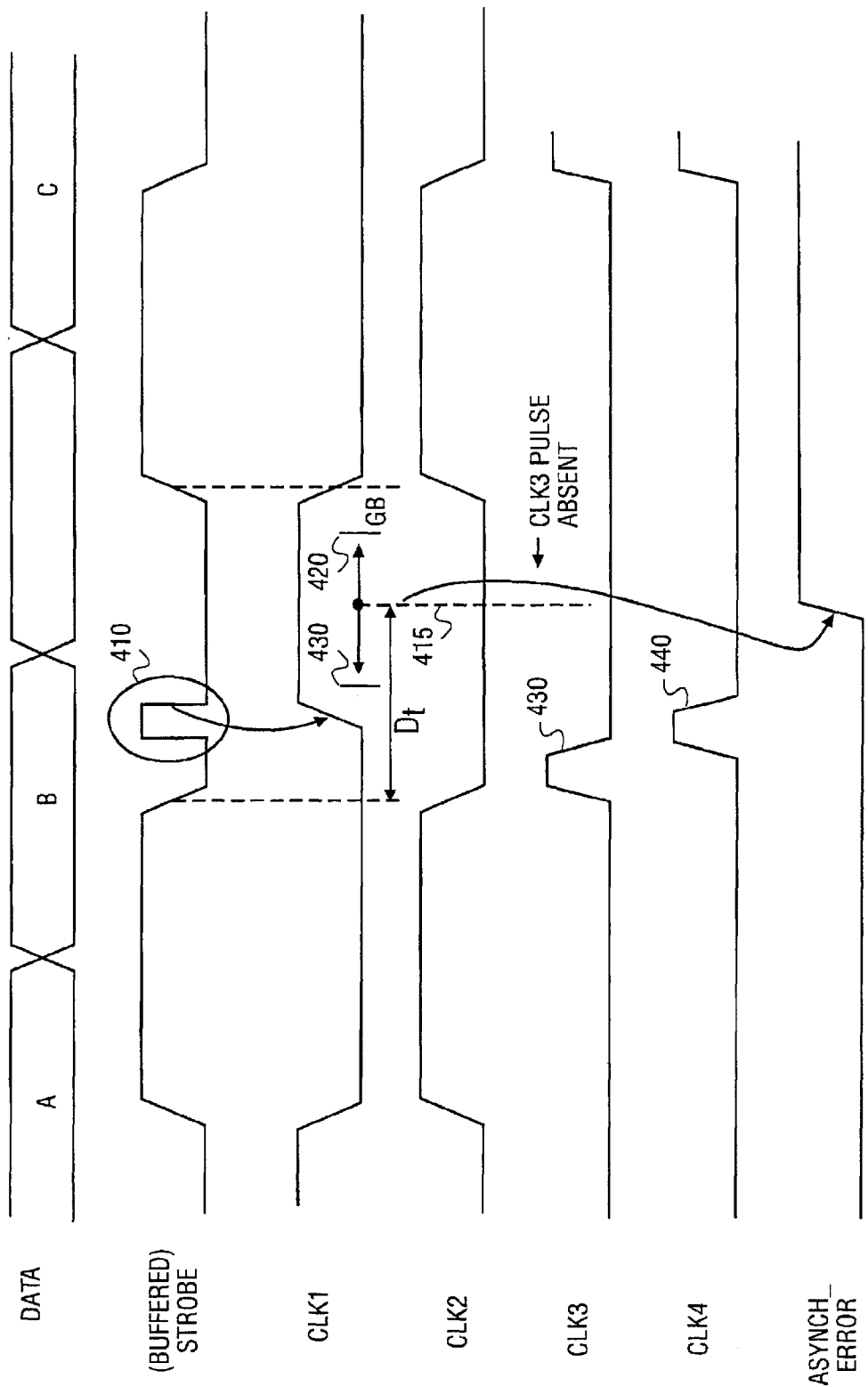
FIG. 4 illustrates a glitch situation detected in one embodiment using presently disclosed techniques.

FIG. 4 illustrates a glitch situation that may be detected using presently disclosed techniques. FIG. 4 illustrates a strobe signal with a glitch 410. The glitch 410 results in the source synchronous state machine outputting clocks which are inadequate to properly latch transmitted data. As shown in FIG. 3, the falling edge of CLK1 should be positioned to capture data element A, the falling edge of CLK2 should be positioned to capture data element B, the falling edge of CLK3 should be positioned to capture data element C, and so on. In FIG. 4, the falling edges of CLK1 and CLK2 are properly positioned.

Subsequent to the falling edge of CLK2, however, the glitch 410 occurs. As a result, the state machine generating the internal clock signals prematurely transitions. Thus, the rising edge of the glitch 410 prematurely truncates a CLK3 pulse 430 and accordingly, at a time marked by a marker 415, the CLK3 signal is in an incorrect state. Similarly, the rising edge of the glitch 410 generates a rising edge of a CLK4 pulse 440. The falling edge of the glitch 410 causes a falling edge of the CLK4 pulse. An asynchronous error signal is generated responsive to CLK3 being in the incorrect state at marker 415.

Figure 5:
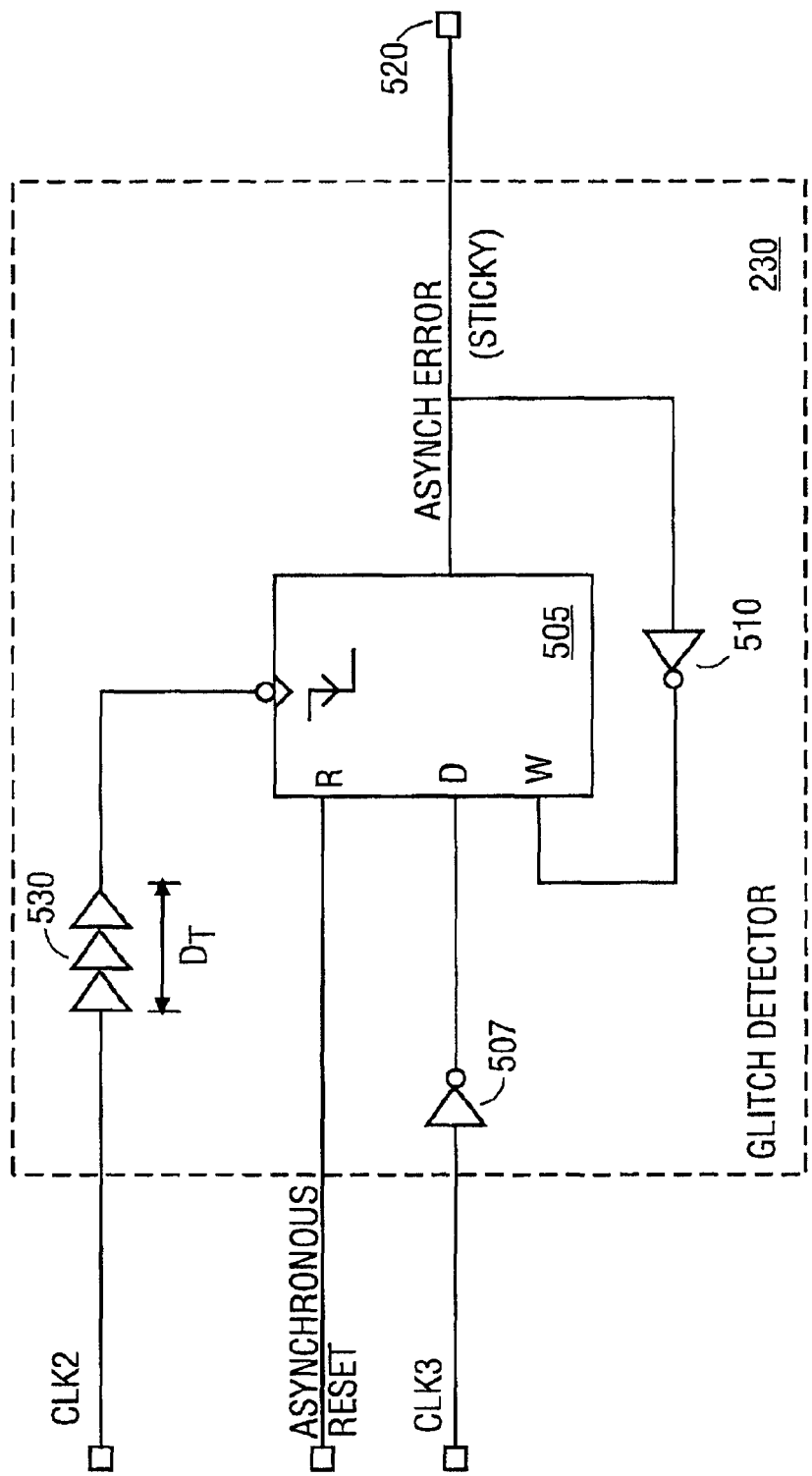
FIG. 5 illustrates one embodiment of a glitch detector.

FIG. 5 illustrates one embodiment of a glitch detector which detects the situation depicted in FIG. 4. The glitch detector 230 includes a latch 505, a delay circuit 530, and an inverter 510. The latch 505 is a falling edge triggered latch having a clock input coupled to receive a delayed version of the CLK2 signal generated by the delay circuit 530. The latch 505 has an enable (E) input coupled to receive an inverted version of the latch output as inverted by the inverter 510. The latch 505 also has a reset input (R) coupled to receive an asynchronous reset signal generated by reset logic once an error-causing transaction has completed. The latch input (D) receives the CLK3 signal inverted by an inverter 507.

The delay circuit 530 has a delay indicated by Dt. If the CLK3 signal is not high when the delayed version of CLK2 falls, then the latch 505 latches a high value (CLK3 inverted). This results in the latch being disabled (via inverter 510) and the error being "sticky", meaning that it is retained until a reset signal is transmitted to the latch reset input (R). Referring back to FIG. 4, the delay Dt is shown between the CLK1 waveform and the CLK2 waveform. The marker 415 indicates the point at which the delayed CLK2 signal falls, capturing the CLK3 signal.

The delay Dt may be adjusted to suit a particular system. In the embodiment shown, the delay Dt is approximately one-half of the active high duration of one of the internal clocks (CLK1, etc.). The delay Dt may be adjusted to check the state of the CLK3 signal at a wide variety of points within the expected CLK3 pulse using conventional techniques to adjust the circuit delay. Markers 420 and 430 indicate a possible range of delays for Dt. Typically, some guardband (GB) may be desirable to avoid having proper transitions diagnosed as glitches.

Numerous other embodiments of the glitch detector may be used. For example, in one embodiment, the glitch detector delays the internal clock signals and checks an internal clock against subsequent internal clock signals rather than prior internal clock signals as done by the glitch detector shown in FIG. 5. Another embodiment detects an incorrect state of a clock or an incorrect transition at any time in a predefined window (e.g., from marker 430 to marker 420) rather than at a single moment in time. Another alternative uses several delay and latch combinations to verify the correct state of the CLK3 pulse at several different points. Various other implementations may be advantageous under different circumstances, as will be appreciated by one of skill in the art.

Figure 6:
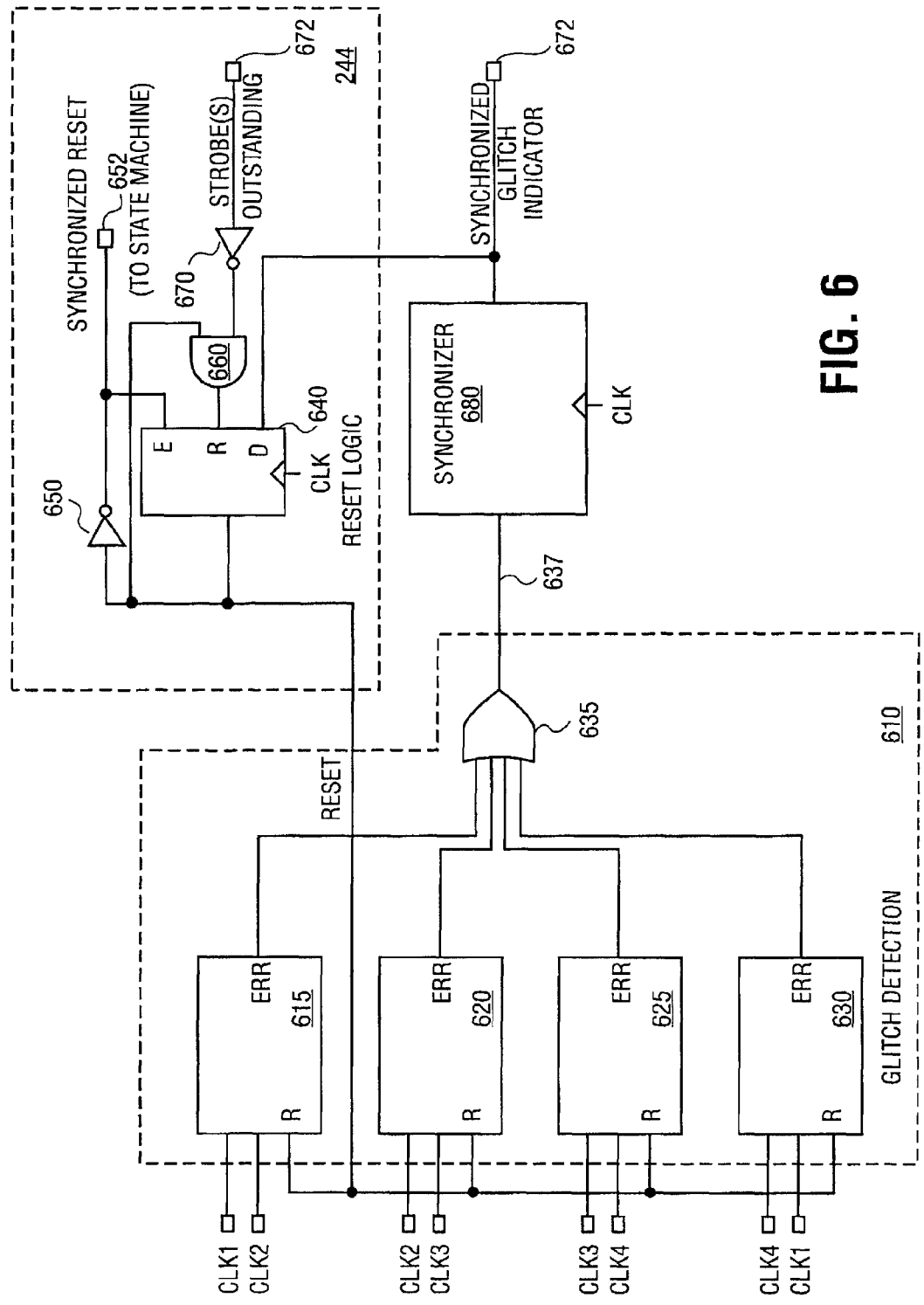
FIG. 6 illustrates glitch detection and reset logic according to one embodiment.

FIG. 6 illustrates glitch detection and reset logic according to one embodiment. The glitch detection logic 610 includes four glitch detectors 615, 620, 625, and 630. In this embodiment, the glitch detector 615 is coupled to receive the CLK1 and CLK2 signals as well as a reset signal. The glitch detector 620 is coupled to receive the CLK2 and CLK3 signals as well as a reset signal. The glitch detector 625 is coupled to receive the CLK3 and CLK4 signals as well as a reset signal, and the glitch detector 630 is coupled to receive the CLK4 and CLK1 signals as well as a reset signal. Each of the glitch detectors 615, 620, 625, and 630 generates an error signal, and an OR gate 635 generates a glitch indicator on a signal line 637. A synchronizer 680, clocked by a core clock signal (CLK) generates a synchronized glitch indicator signal on a signal line 682.

The embodiment of the reset logic 244 shown in FIG. 6 generates reset signals for the glitch detection logic and the source synchronous state machine logic. The reset logic 244 includes a latch 640 that is coupled to receive the synchronized glitch indicator signal at its data input (D). The latch is clocked by a core clock so that the reset signals are synchronized to core clocks. The latch 640 is also configured to be "sticky" by including an inverter 650 which feeds the output back to an enable (E) input. The output of the inverter 650 is the synchronized reset signal that is transmitted on a signal line 652 to the source synchronous state machine in one embodiment. The latch 640 generates a reset when there are no further strobes outstanding for the current transaction (as indicated by bus control logic on signal line 672 and inverted by an inverter 670) and after a glitch has occurred. The reset logic itself is also reset once the reset signal has been synchronized and after there are no strobes outstanding, as signaled by an AND gate 660 which appropriately combines the strobe(s) outstanding and synchronized reset signals and supplies the result to the reset input (R) of the latch 640.

Accordingly, the reset logic facilitates transaction retrying and continued bus operation despite a glitch, by synchronizing the restart of the various affected bus interface components. Additionally, the synchronized glitch indicator indicates in some embodiments to the bus controller that data from the transaction should be discarded. This prevents such data from propagating into the core of such bus agents. By avoiding propagating known incorrect data into the core, the bus agent can avoid having to restart or reset the system. Rather, the bus agent can retry the transaction, and other bus agents in the system need not be alerted that a glitch occurred. This technique may advantageously increase the reliability of systems without having large detrimental performance impacts.

Thus, method and apparatus for detecting and recovering from errors in a source synchronous bus is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A bus agent comprising:

a plurality of data signal inputs to receive a plurality of data signals;

a plurality of strobe inputs to receive a plurality of strobe signals;

a state machine coupled to receive said plurality of strobe signals and to generate therefrom a plurality of clock signals, wherein said state machine is to receive two complementary strobe signals and to generate therefrom four non-overlapping clock signals, wherein said four non-overlapping clock signals have a sequential active period and substantially similar active period; and a strobe glitch detection circuit to monitor said plurality of clock signals produced by said state machine to detect glitches on one or more of said plurality of strobe signals and to generate an error signal if one of said plurality of clocks is in an incorrect state after a delay duration, wherein said strobe glitch detection circuit is coupled to receive two clock signals of said four non-overlapping clock signals, and further wherein said strobe glitch detection circuit is to generate the error signal if a first one of said two clack signals is in the incorrect state at a time determined from the other one of said two clock signals, and wherein said delay duration is less than a duration of said active period.

2. A bus agent comprising:

a plurality of data signal inputs to receive a plurality of data signals, wherein said plurality of data signals comprise a plurality of sets of data signals, each set having an associated strobe and an inverted strobe signal;

a plurality of strobe inputs to receive a plurality of strobe signals;

a state machine coupled to receive said plurality of strobe signals and to generate therefrom a plurality of clock signals; and a strobe glitch detection circuit to monitor said plurality of clock signals produced by said state machine to detect glitches on one or more of said plurality of strobe signals and to generate an error signal if one of said plurality of clocks is in an incorrect state after a delay duration, wherein said strobe glitch detection circuit comprises a plurality of strobe glitch detectors, each of said plurality of strobe glitch detectors being coupled to receive a first clock signal and a second clock signal from said plurality of clock signals and to generate a glitch indicator signal if said second clock signal is in an incorrect state after a predetermined duration measured from a transition of the first clock signal, wherein each glitch detector comprises:

a delay circuit to receive said first clock signal and to generate a delayed first clock signal; and a latch clocked by said delayed first clock signal, said latch being a falling edge clock triggered latch, said latch having a data input coupled to receive said second clock signal and to generate an output error signal if said second clock signal is absent when a falling edge of the delayed first clack signal clocks the latch.

3. The bus agent of claim 2 wherein said output error signal is further coupled to said latch to retain the output error signal in an active state until a reset signal is received.

4. The bus agent of claim 3 further comprising;

a bus controller to retry a transaction during which a strobe glitch is detected in response to detection of said strobe glitch.

5. The bus agent of claim 4 wherein said bus controller is also, in response said output error signal, to stop sending additional bus requests, to disregard data received in conjunction with said transaction, and to reset each glitch detector.

6. The bus agent of claim 5 wherein said bus controller is to reset each glitch when no further strobes are outstanding.

* * * * *

UNITED STATES PATENT AND TRADEMARK OFFICE
CERTIFICATE OF CORRECTION

PATENT NO. : 6,804,800 B2
DATED : October 12, 2004
INVENTOR(S) : Rodriguez

It is certified that error appears in the above-identified patent and that said Letters Patent is hereby corrected as shown below:

<u>Column 8,</u>
Line 41, delete "clack" and insert -- clock --.

Signed and Sealed this

Fifteenth Day of February, 2005

JON W. DUDAS
*Director of the United States Patent and Trademark Office*